(12) United States Patent
De'Longhi et al.

(10) Patent No.: US 10,986,955 B2
(45) Date of Patent: Apr. 27, 2021

(54) COFFEE MACHINE SUITABLE FOR DISPENSING INTO CUPS OF DIFFERENT HEIGHTS

(71) Applicant: De'Longhi Appliances S.R.L., Treviso (IT)

(72) Inventors: Giuseppe De'Longhi, Treviso (IT); Massimo Poggioli, Carbonera (IT); Walter Cecconato, Villorba (IT)

(73) Assignee: De'Longhi Appliances S.R.L., Treviso (CH)

( * ) Notice: Subject to any disclaimer, the term of this patent is extended or adjusted under 35 U.S.C. 154(b) by 270 days.

(21) Appl. No.: 16/300,247

(22) PCT Filed: May 10, 2017

(86) PCT No.: PCT/EP2017/061208
§ 371 (c)(1),
(2) Date: Nov. 9, 2018

(87) PCT Pub. No.: WO2017/194616
PCT Pub. Date: Nov. 16, 2017

(65) Prior Publication Data
US 2019/0142210 A1    May 16, 2019

(30) Foreign Application Priority Data

May 10, 2016   (IT) .................. 102016000047945

(51) Int. Cl.
*A47J 31/44*   (2006.01)
*A47J 31/46*   (2006.01)

(52) U.S. Cl.
CPC ....... *A47J 31/4482* (2013.01); *A47J 31/4428* (2013.01); *A47J 31/469* (2018.08)

(58) Field of Classification Search
CPC . A47J 31/4482; A47J 31/4428; A47J 31/4425
(Continued)

(56) References Cited

U.S. PATENT DOCUMENTS 6,082,246 A * 7/2000 Thorn .................. A47J 31/4482
99/279
7,353,850 B2 * 4/2008 Greiwe ............... A47J 31/4482
141/198
(Continued)

FOREIGN PATENT DOCUMENTS

CH          315281 A    8/1956
CN        2640354 Y    9/2004
(Continued)

OTHER PUBLICATIONS

International Search Report dated Aug. 23, 2017; International Application No. PCT/EP2017/061208; International Filing Date: May 10, 2017; 5 pages.

(Continued)

*Primary Examiner* — Reginald Alexander
(74) *Attorney, Agent, or Firm* — Blank Rome LLP

(57) ABSTRACT

The coffee machine (1) comprises a resting surface (6) for cups (7, 7') and a hydraulic circuit having in cascade a pump, a boiler, an infusion head (3) and a filter holder cup (4) removably engaged with the infusion head (3), also being provided a mobile support structure (8) for supporting the assembly formed by the infusion head (3) and the filter holder cup (4), and a movement means (17) for moving the support structure (8) between a plurality of positions to which different distances of the filter holder cup (4) from the resting surface (6) correspond.

10 Claims, 6 Drawing Sheets

(58) Field of Classification Search
USPC .............................................. 99/284, 302 R
See application file for complete search history.

(56) References Cited

U.S. PATENT DOCUMENTS

| | | | |
|---|---|---|---|
| 8,397,626 B2* | 3/2013 | Winkler | A47J 31/44 |
| | | | 99/284 |
| 2006/0213371 A1* | 9/2006 | Zhao | A47J 31/4482 |
| | | | 99/279 |
| 2006/0266225 A1* | 11/2006 | Hammad | A47J 31/4482 |
| | | | 99/279 |

FOREIGN PATENT DOCUMENTS

| | | |
|---|---|---|
| EP | 0153549 A1 | 9/1985 |
| EP | 1774883 A1 | 4/2007 |
| WO | 2006127114 A2 | 11/2006 |

OTHER PUBLICATIONS

Written Opinion dated Aug. 23, 2017; International Application No. PCT/EP2017/061208; International Filing Date: May 10, 2017; 6 pages.
English translation of Swiss Patent Publication CH315281; Published Aug. 15, 1956; 5 pages.
English translation of Chinese Patent Publication CN2640354; Published Sep. 15, 2004; 7 pages.
English translation of European Patent Publication EP1774883; Published Apr. 18, 2007; 16 pages.

* cited by examiner

COFFEE MACHINE SUITABLE FOR DISPENSING INTO CUPS OF DIFFERENT HEIGHTS

RELATED APPLICATIONS

This application is a U.S. national phase application of International Application No. PCT/EP2017/061208, filed May 10, 2017; which application claims priority to Italy Application No. 102016000047945, filed May 10, 2016. Each of the above-identified related applications are incorporated by reference.

FIELD OF USE

Background of the Invention

The present invention relates to a manual coffee machine having a hydraulic circuit comprising in cascade a supply pump, a boiler, an infusion head and a filter holder cup removably engaged with the infusion head for making the coffee infusion that is then dispensed into a cup.

One of the main drawbacks complained of in manual coffee machines of this type consists of the fact that the practicality of use may be influenced by the height of the cup that is from time to time positioned below the dispenser located in the filter holder cup.

When a tall cup is used for a cappuccino, the positioning of the cup below the filter holder cup may be complicated or even impossible because there is not sufficient space between the filter holder cup and the resting surface for the cups.

In this case, the user is obliged to use two cups for preparing a cappuccino, a short one for preparing the coffee and a tall one containing the emulsified milk into which the coffee is poured.

The need for transferring the coffee to another cup prior to consumption may cause the decline of the organoleptic properties of the final product.

When, instead, a short cup is used, generally there are not any problems connected with its positioning below the filter holder cup.

However, if the position of the filter holder cup is very much higher than the cup, it is possible that the coffee in free gravitational fall acquires enough kinetic energy to generate uncontrolled splashes at the time of impact against the wall of the cup.

Splashes of coffee coming out of the cup can however dirty the resting surface of the coffee machine.

SUMMARY OF THE INVENTION

The technical task of the present invention is, therefore, to provide a coffee machine of the type indicated which allows to obviate the above-described technical drawbacks of the prior art.

Within the scope of this technical task an object of the invention is that of realising a coffee machine of the type indicated above that has the same practicality and convenience of use regardless of the height of the cup used.

Another object of the invention is that of realising a coffee machine of the type described above that guarantees the same product quality in the cup regardless of the height of the cup used.

The technical task, as well as these and other objects, according to the present invention are reached by realising a coffee machine comprising a resting surface for cups and a hydraulic circuit having in cascade a pump, a boiler, an infusion head and a filter holder cup removably engaged with said infusion head, characterised in that it comprises a mobile support structure for supporting the assembly formed by said infusion head and said filter holder cup, and a movement means for moving said support structure between a plurality of positions to which different distances of said filter holder cup from said resting surface for cups correspond.

The possibility to regulate the distance of the filter holder cup from the cup resting surface, allows the coffee machine to be adapted from time to time to the height of the cup used so as to leave the necessary space below the filter holder cup for positioning, maneuvering and easily removing the cup.

The movement of the support structure can even be exploited for appropriately adjusting the length of the path that the coffee performs in the air before being deposited in the cup.

The shorter the length of the free gravitational fall path through the air, the lower the possibility that splashes of coffee can come out of the cup.

The length of the path of the coffee through the air can finally be adjusted to influence to a certain extent also the characteristics of the coffee in the cup.

Other characteristics of the present invention are further defined in the claims hereinbelow.

BRIEF DESCRIPTION OF THE DRAWINGS

Further characteristics and advantages of the invention will become more apparent from the description of a preferred, but not exclusive, embodiment of the coffee machine according to the invention, which is illustrated by way of approximate and non-limiting example in the attached drawings, of which.

DETAILED DESCRIPTION OF THE ILLUSTRATED EMBODIMENTS

Figure 1:
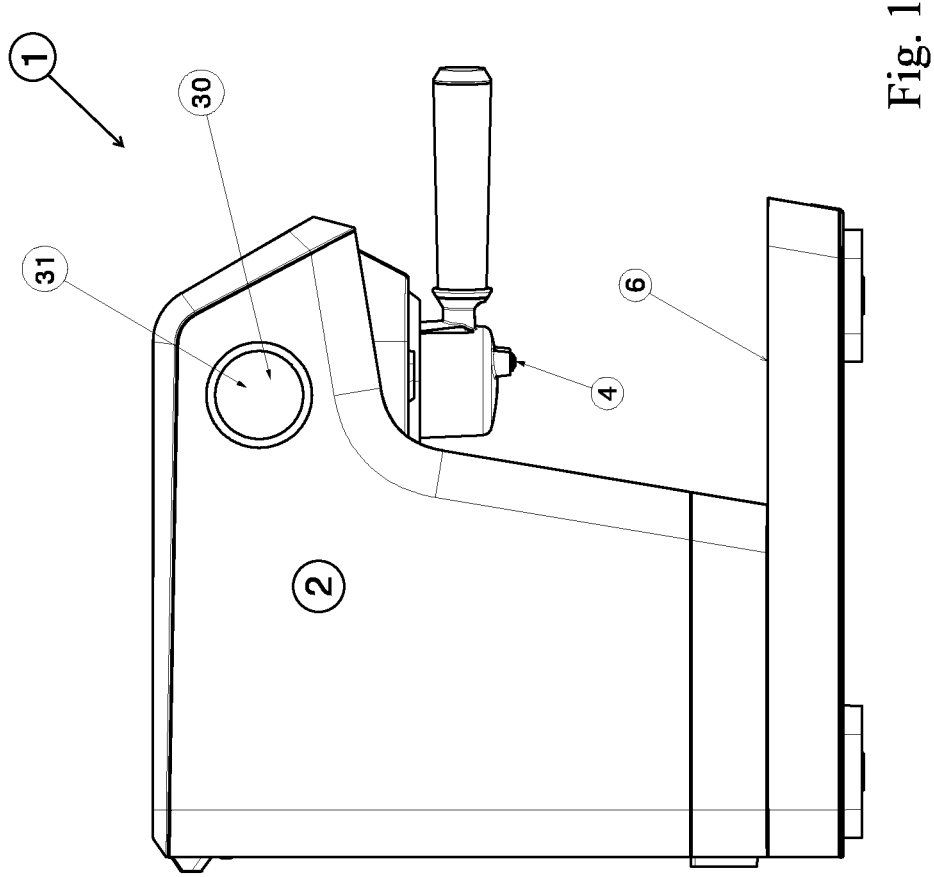
FIG. 1 shows a lateral elevation view of the coffee machine.
Figure 2:
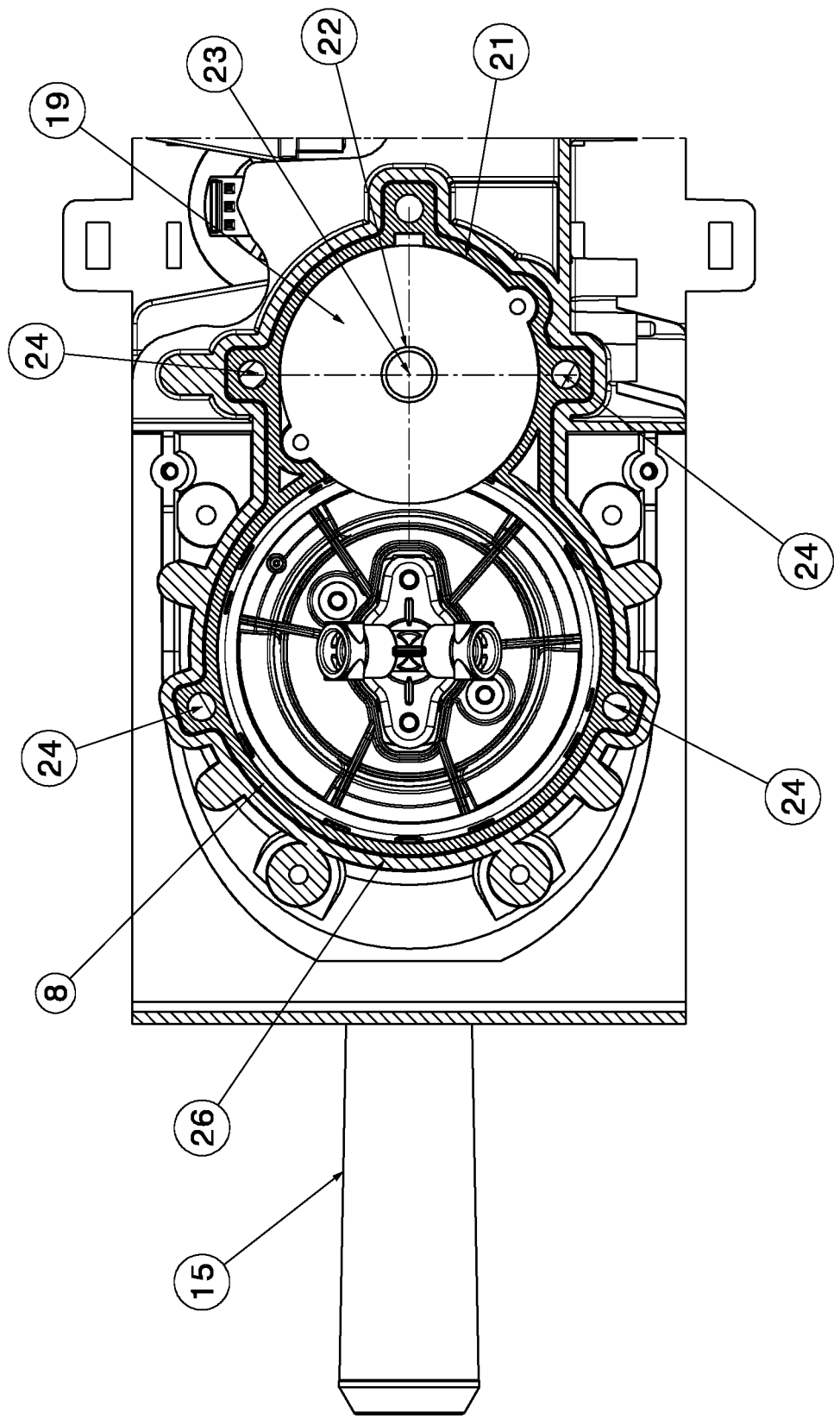
FIG. 2 shows a plan view from above of the coffee machine partially open to highlight the support structure.
Figure 3:
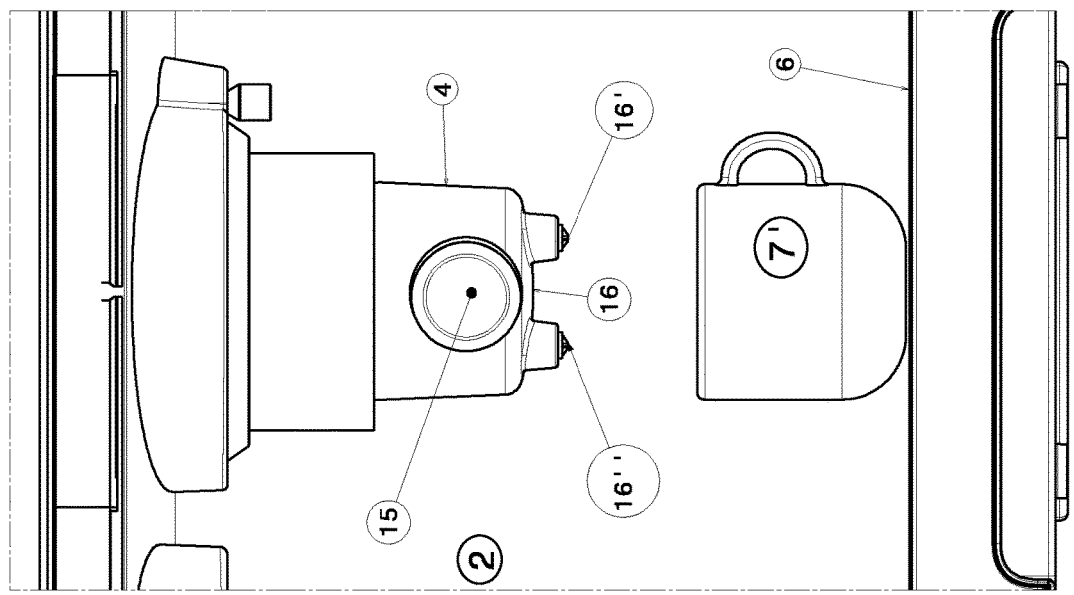
FIG. 3 shows a front view of the coffee machine with the support structure in the lowered position.
Figure 4:
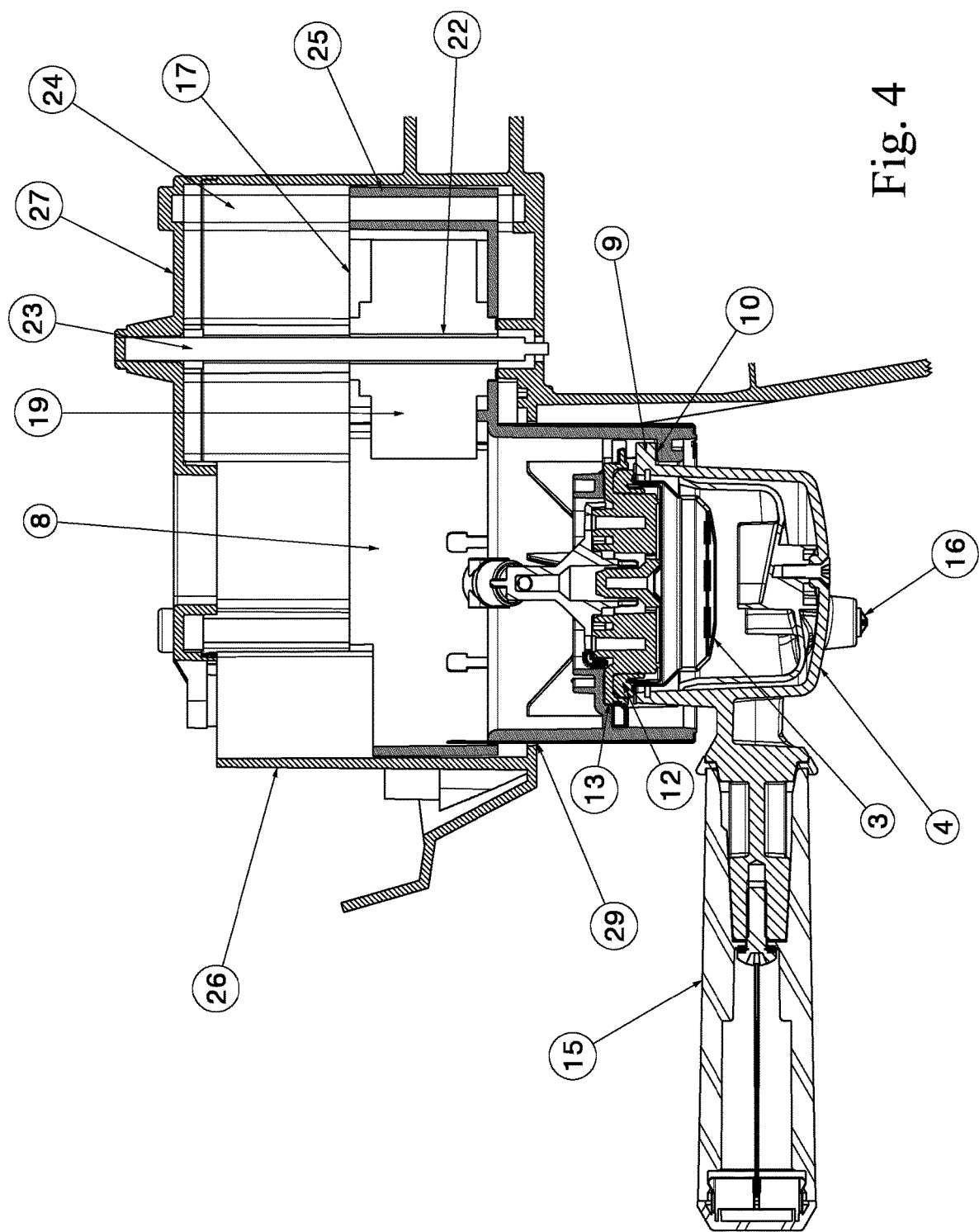
FIG. 4 shows a lateral sectional elevation view of the coffee machine with the support structure in the position of FIG. 3.
Figure 5:
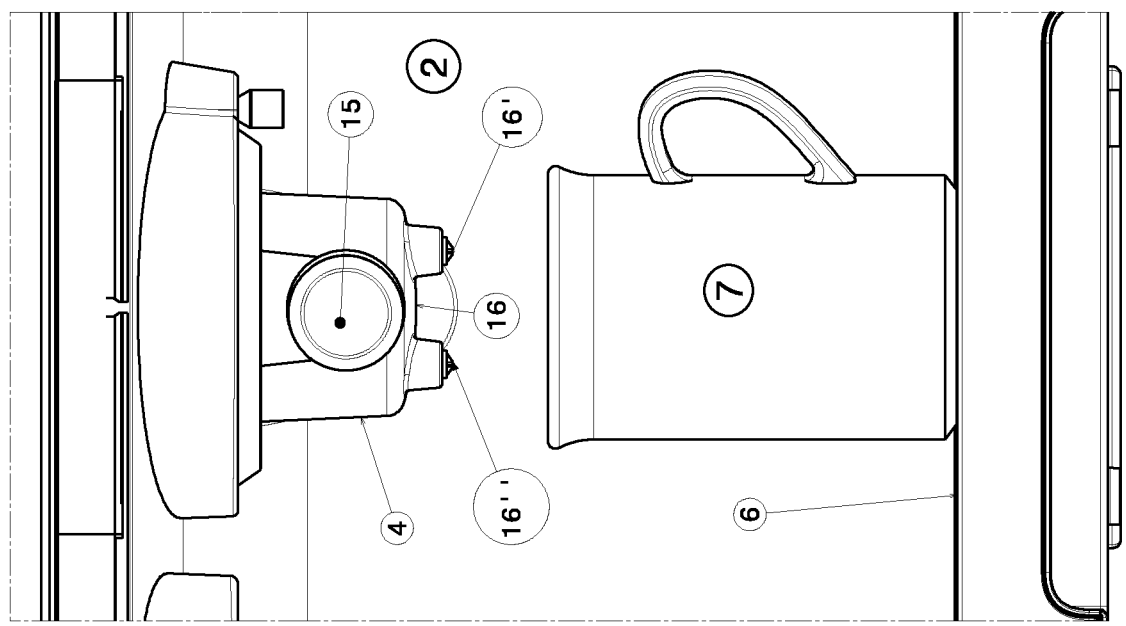
FIG. 5 shows a front view of the coffee machine with the support structure in the raised position.
Figure 6:
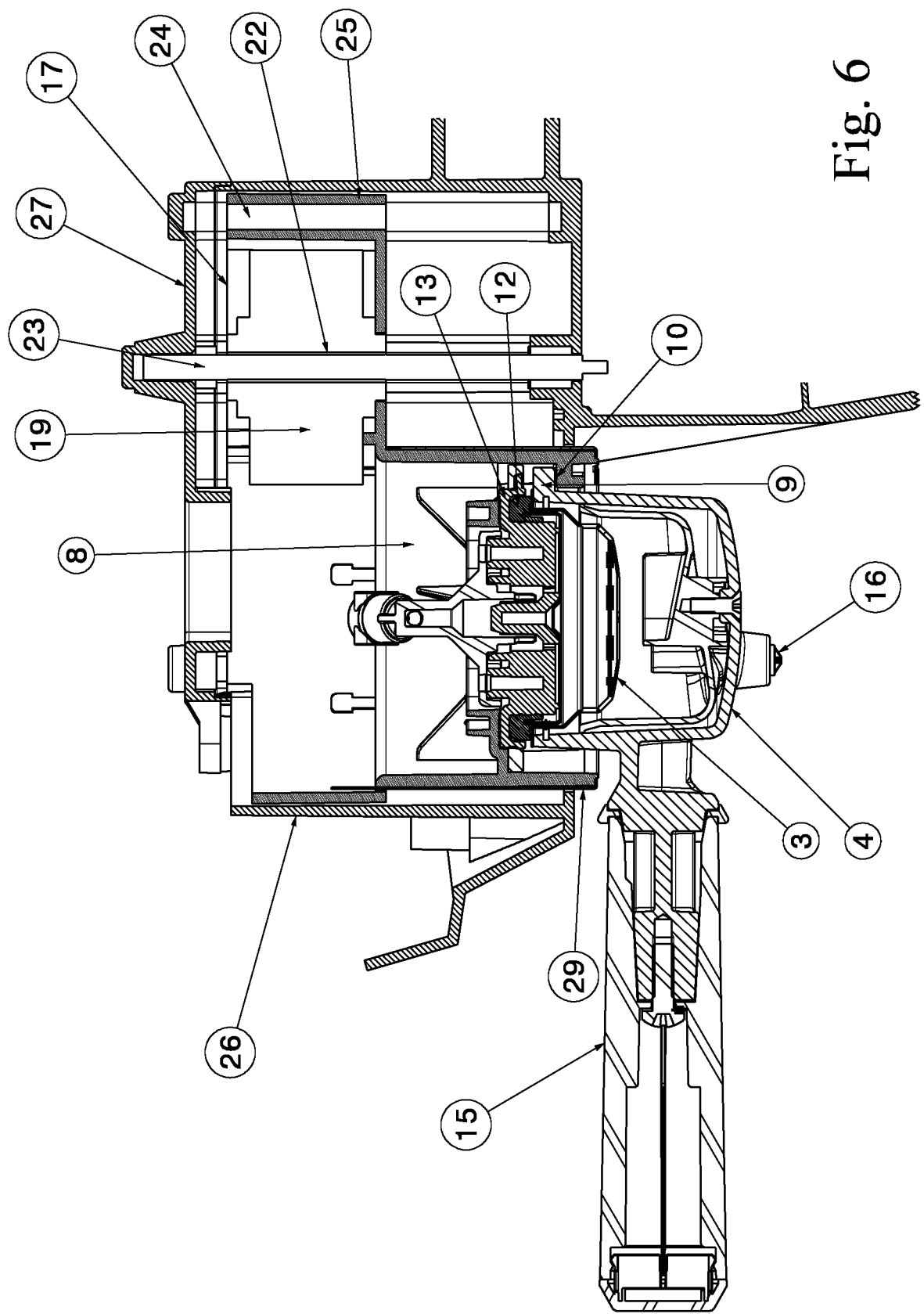
FIG. 6 shows a lateral sectional elevation view of the coffee machine with the support structure in the position of FIG. 5.

The coffee machine indicated generally with reference number 1 in a known way comprises a frame 2 in which the components appointed for the operation of the coffee machine 1 are mounted, including the components of a hydraulic circuit comprising in cascade a supply pump (not shown), a boiler (not shown), an infusion head 3 and a filter holder cup 4 removably engaged in a leakage-tight manner with the infusion head 3.

The assembly formed by the infusion head 3 and the filter holder cup 4 is arranged in a raised position with respect to a resting surface 6 for cups 7, 7' and is supported by a support structure 8 to which the filter holder cup 4 is removably fixed through a bayonet joining system.

In particular the bayonet joining system comprises tabs 9 of the filter holder cup 4 clamped by an inclined plane 10 of the support structure 8 against a gasket 12 supported by an outer perimetral flange 13 of the infusion head 3.

The filter holder cup 4 further envisages, as known, a gripping handle 15 and an external coffee dispenser 16 equipped with two outlet lines 16', 16".

The leakage-tight engagement of the filter holder cup 4 with the infusion head 3 through the bayonet system which envisages a rotation of the filter holder cup 4 is not the only conceivable one.

For example, a mutual coupling of the two parts may be provided through the effect of the sliding of the filter holder cup 4 along inclined translation guides.

Advantageously, relevant movement means 17 for moving the support structure 8 are provided between a plurality of positions to which different distances of the filter holder cup 4 from the resting surface 6 for the cups 7, 7' correspond.

The assembly formed by the infusion head 3 and by the filter holder cup 4 is supported by the support structure 8 so as to solidly share the movement thereof.

In particular, the support structure 8 has a fixing seat 18 into which the infusion head 3 is fixed.

Since the assembly fomed by the infusion head 3 and by the filter holder cup 4 is movable, the infusion head 3 has a hose (not shown) for the hydraulic connection to the boiler.

The support structure 8 is slidable along a fixed translation guide.

The translation guide is configured and arranged to guide the support structure 8 in the orthogonal direction to the resting surface 6 for the cups 7, 7'.

The translation guide comprises a plurality of guide columns 24 in which guide holes 25, which are located in the support structure 8, are slidably engaged.

The movement means 17 comprises a rotary motor 19.

The rotary motor 19 is fixed into a housing seat 21 afforded in the support structure 8 so as to solidly share the translation movement thereof along the translation guide.

The housing seat 21 of the rotary motor 19 is arranged laterally and superiorly to the fixing seat 18 of the infusion head.

The movement means 17 also envisages a mechanical transmission adapted for the transformation of a rotation of the rotary motor 19 into a translation of the support structure 8 along the translation guide.

The mechanical transmission comprises a female thread 22 activated in rotation directly by the rotary motor 19 and a fixed endless screw 23 engaged with the female thread 22.

The female thread 22 and the endless screw 23 have an axis arranged orthogonally to the resting surface 6 for the cups 7, 7'.

The support structure 8 supporting the translation guide and the endless screw 23 is housed in a box body 26.

The box body 26 is fixed to the frame 2 of the coffee machine 1.

Preferably, the box body 26 has a removable cover 27 for access to the support structure 8.

The support structure 8 is accessible inferiorly through an opening 29 of the box body 26 for the engagement of the filter holder cup 4 with the infusion head 3.

The coffee machine 1 advantageously also has a manual control 30 for regulating the position of the support structure 8.

The manual control 30 can be formed by an external handle 31.

The direction and angular magnitude of the rotation of the handle 31 are interpreted by the electronic controller of the machine for generating a corresponding signal for activating the rotary motor 19.

The electronic controller correlates the activation duration and respectively the rotation direction of the motor 19 to an angular magnitude and respectively a rotation direction of the handle 31.

A discrete or even continuous regulation of the position of the support structure 8 can be envisaged.

Essentially, when the user acts on the handle 31 the motor 19 is activated which, due to the effect of the coupling of the female thread 22 with the endless screw 23, is drawn in translation along the endless screw 23 solidly with the support structure 8 and with the assembly 5.

Preferably, to obtain an effective and precise regulation of the position of the support structure 8, the rotary motor 19 is a step motor.

By way of example an 80 mm stroke is provided for the support structure 8 which allows the filter holder cup 4 to reach a maximum height position in which it is 160 mm from the resting surface 6 for the cups 7, 7' for the positioning of a tall cup 7, a minimum height position in which it is 80 mm from the resting surface 6 for cups 7, 7' for the positioning of a short cup 7', and any intermediate height positions.

In an embodiment of the coffee machine not shown, the frame 2 of the coffee machine is formed by structurally independent modules rigidly connected to each other. In that case the module of the frame 2 integrates the box body 26. The modules comprise a primary module, integrating the box body 26, where the primary components which are necessary for performing the basic functions of the coffee machine 1 are mounted, and secondary modules, positioned laterally and/or below the primary module, where secondary modules of the coffee machine 1 are possibly mounted. The secondary modules cooperate with the primary module to define the total height and/or width of the coffee machine 1. This solution allows identical primary modules to be used for the construction of various types and models of coffee machine 1. The primary module represents a universal element that does not require adaptation as the type and model of coffee machine change and is therefore the common element to all types and models of coffee machine. As the type and model of coffee machine change, exclusively the secondary modules change, which have in common an identical mechanical connection means to the primary module.

The coffee machine as conceived herein is susceptible to many modifications and variations, all falling within the scope of the inventive concept; furthermore, all the details are replaceable by technically equivalent elements.

In practice the materials used, as well as the dimensions, can be any according to needs and the state of the art.

The invention claimed is:

1. A coffee machine (1) comprising a resting surface (6) for cups (7, 7') and a hydraulic circuit having in cascade a pump, a boiler, an infusion head (3) and a filter holder cup (4) removably engaged with said infusion head (3), further comprising a mobile support structure (8) for supporting an assembly formed by said infusion head (3) and said filter holder cup (4), and means (17) for moving said support structure (8) between a plurality of positions to which different distances of said filter holder cup (4) from said resting surface (6) correspond, wherein said movement means (17) comprises:

a rotary motor (19); and a mechanical transmission adapted for the transformation of a rotation of said rotary motor (19) into a translation of said support structure (8) along a translation guide, where the mechanical transmission comprises an endless screw (23) engaged in a female thread (22), where the endless screw (23) is fixed and the female thread (22) is activated in rotation by said rotary motor (19).

2. The coffee machine (1) according to claim 1, wherein said assembly is movable integrally with said support structure (8).

3. The coffee machine (1) according to claim 1, wherein said translation guide is configured and arranged for a translation of said support structure (8) in an orthogonal direction to said resting surface (6).

4. The coffee machine (1) according to claim 3, wherein said translation guide comprises a plurality of guide columns (24) in which guide holes (25) are engaged, afforded in said support structure (8).

5. The coffee machine (1) according to claim 1, wherein said rotary motor (19) is supported by said support structure (8) in an integral way in translation along said translation guide.

6. The coffee machine (1) according to claim 1, wherein said female thread (22) and said endless screw (23) have an axis orthogonal to said resting surface (6).

7. The coffee machine (1) according to claim 1, wherein said support structure (8) supporting said translation guide and said endless screw (23) is housed in a box body (26).

8. The coffee machine (1) according to claim 1, further comprising a manual control (30) for regulating a position of said support structure.

9. The coffee machine (1) according to claim 1, wherein said infusion head (3) has a flexible hose for hydraulic connection to said boiler.

10. The coffee machine (1) according to claim 1, further comprising an assemblable frame (2) formed by structurally independent modules rigidly connected to each other.

\* \* \* \* \*